(12) United States Patent
Han et al.

(10) Patent No.: US 11,592,685 B2
(45) Date of Patent: Feb. 28, 2023

(54) APPARATUS FOR DISPLAYING FLOATING IMAGE AND VEHICULAR DISPLAY MODULE INCLUDING THE SAME

(71) Applicants: HYUNDAI MOTOR COMPANY, Seoul (KR); KIA MOTORS CORPORATION, Seoul (KR); University-Industry Cooperation Group of Kyung Hee University, Yongin-si (KR)

(72) Inventors: Jai Min Han, Suwon-si (KR); Sung Wook Min, Seoul (KR); Sung Won Choi, Seoul (KR)

(73) Assignees: Hyundai Motor Company, Seoul (KR); Kia Motors Corporation, Seoul (KR); University-Industry Cooperation Group of Kyung Hee University, Yongin-si (KR)

( * ) Notice: Subject to any disclaimer, the term of this patent is extended or adjusted under 35 U.S.C. 154(b) by 259 days.

(21) Appl. No.: 17/029,848

(22) Filed: Sep. 23, 2020

(65) Prior Publication Data
US 2021/0364818 A1 Nov. 25, 2021

(30) Foreign Application Priority Data
May 20, 2020 (KR) .................. 10-2020-0060044

(51) Int. Cl.
*G02B 30/56* (2020.01)
*G02B 17/08* (2006.01)
(Continued)

(52) U.S. Cl.
CPC ............... *G02B 30/56* (2020.01); *G02B 3/08* (2013.01); *G02B 5/124* (2013.01); *G02B 17/08* (2013.01); *G02B 27/0018* (2013.01)

(58) Field of Classification Search
CPC ....... F04D 17/12; F04D 29/582; F25J 1/0282; F25J 1/029; F25J 2215/62; F25J 2230/04;
(Continued)

(56) References Cited

U.S. PATENT DOCUMENTS 10,012,841 B1 * 7/2018 Frayne ................. H04N 13/229
2011/0285965 A1 * 11/2011 Sugiyama .............. G02B 5/136
353/10

FOREIGN PATENT DOCUMENTS

KR 10-1532327 6/2015

* cited by examiner

*Primary Examiner* — Joseph P Martinez
*Assistant Examiner* — Vipin Patel
(74) *Attorney, Agent, or Firm* — Fox Rothschild LLP

(57) ABSTRACT

An apparatus for displaying a floating image is disclosed. The apparatus includes a light source that extends in a planar direction and emits light for realizing the floating image, a collecting lens, which extends parallel to the light source and refracts the light, a reflective plate, which faces the collecting lens and reflects the light that is refracted at the collective lens, and a dihedral reflector array, which extends in a planar direction and includes mirrors extending in directions intersecting each other, where a first surface of the dihedral reflector array facing the reflective plate such that the reflected light is incident on the first surface, and the reflected light is emitted from a second surface of the dihedral reflector array by being reflected by the mirrors, thereby realizing the floating image at a position spaced apart from the second surface.

11 Claims, 8 Drawing Sheets

(51) Int. Cl.
*G02B 27/00* (2006.01)
*G02B 5/124* (2006.01)
*G02B 3/08* (2006.01)

(58) Field of Classification Search
CPC .. F25J 2230/20; F25J 2230/22; F25J 2230/60;
F25J 2230/80; F25J 2245/02; F25J
2270/02; F25J 2270/80; F25J 2270/88;
F25J 3/0219; F25J 3/0238; F25J 3/0266;
G02B 17/08; G02B 27/0018; G02B 3/08;
G02B 30/56; G02B 5/124; Y02C 20/40
See application file for complete search history.

Fig. 1
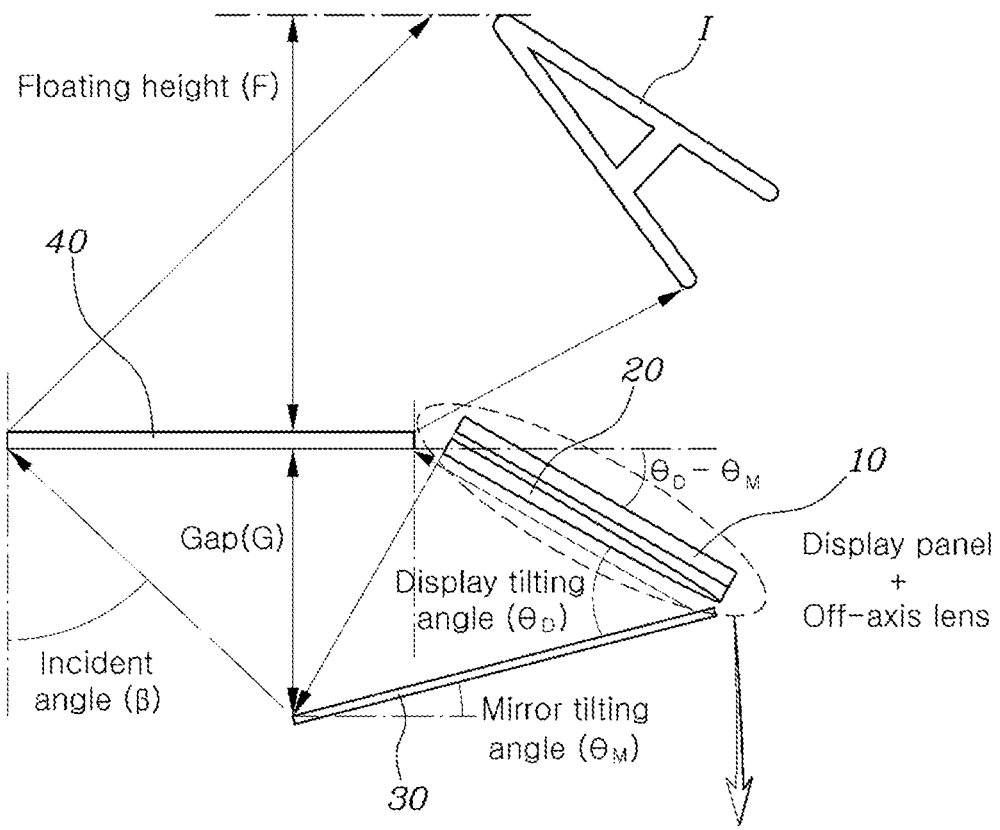
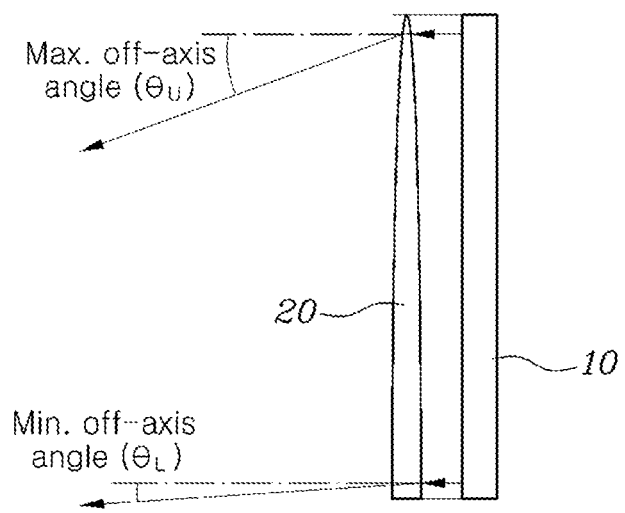

APPARATUS FOR DISPLAYING FLOATING IMAGE AND VEHICULAR DISPLAY MODULE INCLUDING THE SAME

CROSS-REFERENCE TO RELATED APPLICATION

This application claims the priority to and the benefit of Korean Patent Application No. 10-2020-0060044, filed on May 20, 2020, the entire contents of which are incorporated herein by reference.

TECHNICAL FIELD

The present disclosure relates to an apparatus for displaying a floating image and a vehicular display module including the same, and more particularly to an apparatus for displaying a floating image, which may be capable of improving display quality while reducing the thickness of the apparatus, and a vehicular display module including the same.

BACKGROUND

The statements in this section merely provide background information related to the present disclosure and may not constitute prior art.

Recent multimedia content has been harmonized with advanced technologies so as to realize expression in various manners and novel display systems. At the time of the fourth industrial revolution, sensory content is attracting more and more attention with the emergence of mixed reality (MR) as a successor to virtual reality (VR) and augmented reality (AR).

To this end, as technologies for floating an image, which is displayed on a display panel, in the air, a transmission type using a dihedral reflector array and a reflection type using a retro reflector are employed.

Because the reflection-type technology poses problems in that the height of a floating image is limited and brightness is lowered due to the use of a beam splitter, the transmission-type technology using the dihedral reflector array is attracting more attention.

However, in the transmission-type technology using the dihedral reflector array, there is a need to overcome problems in which the volume of the system must be increased in order to adjust the height of a floating image and in which an unwanted ghost image is generated.

Details described as the background art are intended merely for the purpose of promoting the understanding of the background of the present disclosure and should not be construed as an acknowledgment of the prior art that is previously known to those of ordinary skill in the art.

SUMMARY

Therefore, the present disclosure provides an apparatus for displaying a floating image, which further includes a lens and mirrors in order to increase the height of the floating image while reducing the thickness of the apparatus and to eliminate a ghost image.

In accordance with the present disclosure, the above and other objects may be accomplished by an apparatus for displaying a floating image including a light source that extends in a planar direction and emits light for realizing an image, a collecting lens, which extends in a direction parallel to the light source and refracts light emitted from the light source, a reflective plate, which is disposed so as to face the collecting lens and reflects the light that is refracted at the collective lens and is incident thereon, and a dihedral reflector array, which extends in a planar direction and includes mirrors, which extend in directions intersecting each other, a first surface of the dihedral reflector array being disposed so as to face the reflective plate such that the light reflected by the reflective plate is incident on the first surface, is reflected by the mirrors, and is emitted from a second surface of the dihedral reflector array, thereby realizing an image at a position spaced apart from the second surface.

The light source may be a display panel configured to generate light for realizing an image, which is floated at a position spaced apart from the dihedral reflector array.

The collecting lens may be an off-axis lens, which extends in a planar direction parallel to the light source and a focal axis of which is positioned beyond an outermost end of the collecting lens.

The collecting lens may be a portion of a Fresnel lens in which a plurality of prisms configured to refract incident light are coaxially arranged.

The collecting lens may be disposed so as to be spaced apart from the reflective plate and to face the reflective plate, and may be inclined such that the collecting lens becomes close to the reflective lens moving from a first end thereof toward a second end thereof.

The first end of the collecting lens may be an outermost end closest to a focal axis of the collecting lens, and the second end of the collecting lens may be an outermost end farthest from the focal axis of the collecting lens.

The collecting lens may be inclined at an angle that satisfies requirements that the second end of the collecting lens should be spaced apart from the reflective plate and that the focal axis of the light that is refracted at the second end of the collecting lens and is then reflected by the reflective plate should be positioned beyond the first end of the collecting lens.

The reflective plate may be disposed so as to face both the collecting lens and the dihedral reflector array, which are spaced apart from each other in a planar direction.

The reflective plate may be disposed so as to be inclined with respect to the dihedral reflector array at a predetermined angle, which is determined in consideration of a ghost-image-displaying area in which a ghost image is generated due to the reflection of incident light at the dihedral reflector array.

The reflective plate may be inclined such that a line normal to a flat surface thereof is parallel to the boundary of the ghost-image-displaying area.

The dihedral reflector array may include an upper plate and a lower plate, each of which includes mirrors which are arranged in a planar direction, the mirrors of the upper plate and the mirrors of the lower plate extending in directions intersecting each other.

The dihedral reflector array may be constructed such that the mirrors extend in directions intersecting each other at a right angle and the light reflected by the reflective plate is obliquely incident on the individual mirrors, which extend in directions intersecting each other.

In accordance with another aspect of the present disclosure, there is provided a vehicular display module including the apparatus for displaying a floating image, and an interior structure extending in the direction in which the dihedral reflector array extends, wherein the interior structure is a dashboard or a console panel for a vehicle, and the floating image is formed at a position above the interior structure or at a position between the apparatus and an occupant.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a view illustrating the construction of an apparatus for displaying a floating image in some forms of the present disclosure;

Figure 2:
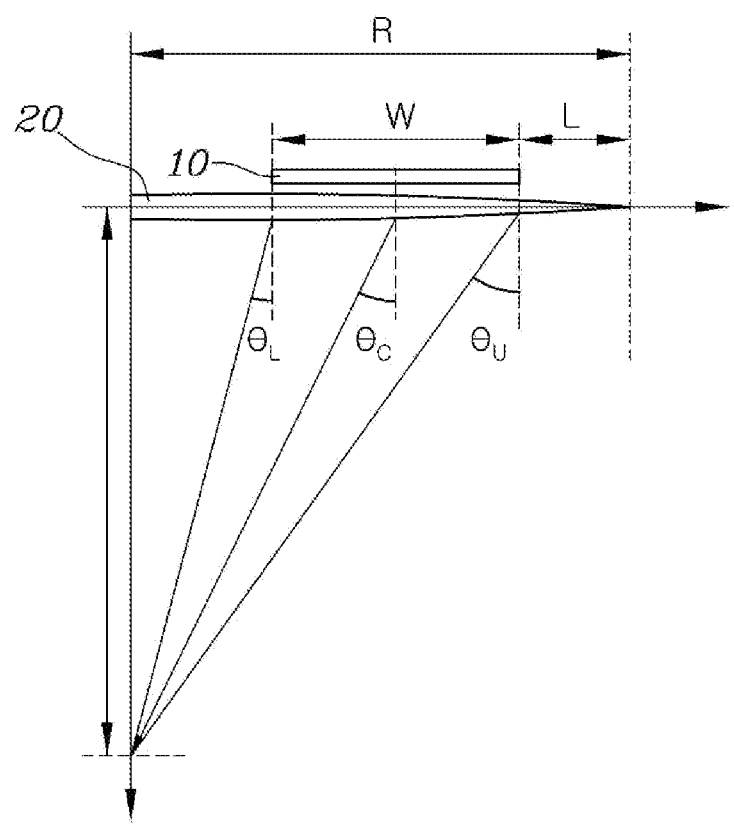
FIG. 2 is a view illustrating the relationship between a light source and a collecting lens in some forms of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Specific structural and functional descriptions of embodiments of the present disclosure disclosed herein are only for illustrative purposes of the embodiments of the present disclosure. The present disclosure may be embodied in many different forms without departing from the spirit and significant characteristics of the present disclosure. Therefore, the embodiments of the present disclosure are disclosed only for illustrative purposes and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first," "second," etc. may be used herein to describe various elements, these elements should not be construed as being limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that explain the relationships between elements, such as "between," "directly between," "adjacent to," or "directly adjacent to," should be understood in the same way.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meaning as those commonly understood by one of ordinary skill in the art to which this disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

Hereinafter, exemplary embodiments of the present disclosure will be described in detail with reference to the accompanying drawings. Throughout the drawings, the same reference numerals will refer to the same or like parts.

FIG. 1 is a view illustrating the construction of an apparatus for displaying a floating image according to an embodiment of the present disclosure.

Referring to FIG. 1, the apparatus for displaying a floating image according to an embodiment of the present disclosure includes a light source 10, which extends in a planar direction and emits light for realizing an image, a collecting lens 20, which extends in a direction parallel to the light source 10 and refracts the light emitted from the light source 10, a reflective plate 30, which is disposed so as to face the collecting lens 20 and reflects the light that is refracted at the collective lens 20 and is incident thereon, and a dihedral reflector array 40, which extends in a planar direction and includes mirrors, which extend in directions intersecting each other, one surface of the dihedral reflector array 40 being disposed so as to face the reflective plate 30 such that the light reflected by the reflective plate 30 is incident on the one surface, is reflected by the mirrors, and is emitted from the other surface of the dihedral reflector array 40, thereby realizing an image at a position spaced apart from the outer surface.

The light source 10 is a device that receives electric power and generates light for realizing an image. In an embodiment, the light source 10 may be a display panel. The light source 10 may extend in a planar direction so as to cause a floating image to extend in a planar direction.

The collecting lens 20 may extend parallel to the light source 10, and may be spaced apart from the light source by a predetermined distance. The collecting lens 20 may refract the light that is generated by the light source 10 in a direction such that the light is concentrated to one point.

As will be described later, the collecting lens 20 may be a convex lens or a Fresnel lens, which is configured to concentrate light on a focal point.

The reflective plate 30 may be a mirror configured to reflect light in which a reflective surface thereof is disposed so as to face the collecting lens 20 and to reflect the light incident thereon toward the dihedral reflector array 40.

Both the dihedral reflector array 40 and the collecting lens 20 may be disposed so as to face the reflective plate 30.

The dihedral reflector array 40 may be made of a light-permeable material (for example, glass or the like), and may include mirrors that extend in directions intersecting each other. Light incident on one surface of the dihedral reflector array 40 may be emitted through the other surface of the dihedral reflector array 40.

The dihedral reflector array 40 may be divided by the mirrors, which extend in directions intersecting each other, and may be configured to have a dihedral corner reflector array (DCRA) structure.

Light incident on the dihedral reflector array 40 may be reflected by an angle of reflection, which is determined according to the angle of incidence of the light, by means of the mirrors, which extend in directions intersecting each other. Light incident thereon at various angles of incidence from one point may be collected to one point at a symmetrical position through the dihedral reflector array 40, thereby forming an image.

Particularly, the light incident on the dihedral reflector array 40 may form a desired image when the light is reflected an even number of times by the mirrors, which extend in directions intersecting each other, but may form an unwanted ghost image when the light is reflected an odd number of times by the mirrors.

The apparatus for displaying a floating image according to an embodiment of the present disclosure provides an effect of reducing the volume of the apparatus symmetrical with the floating height of a floating image by allowing the light emitted from the light source 10 to be incident on the dihedral reflector array 40 by means of the collecting lens 20 and the reflective plate 30, unlike the conventional technology.

The light source 10 may be a display panel, which generates light for realizing an image, which is floated at a position spaced apart from the dihedral reflector array 40.

Here, the display panel may be embodied by various panels configured to realize an image, such as a cathode ray tube (CRT), a video display terminal (VDT) and a liquid crystal display (LCD).

Figure 3:
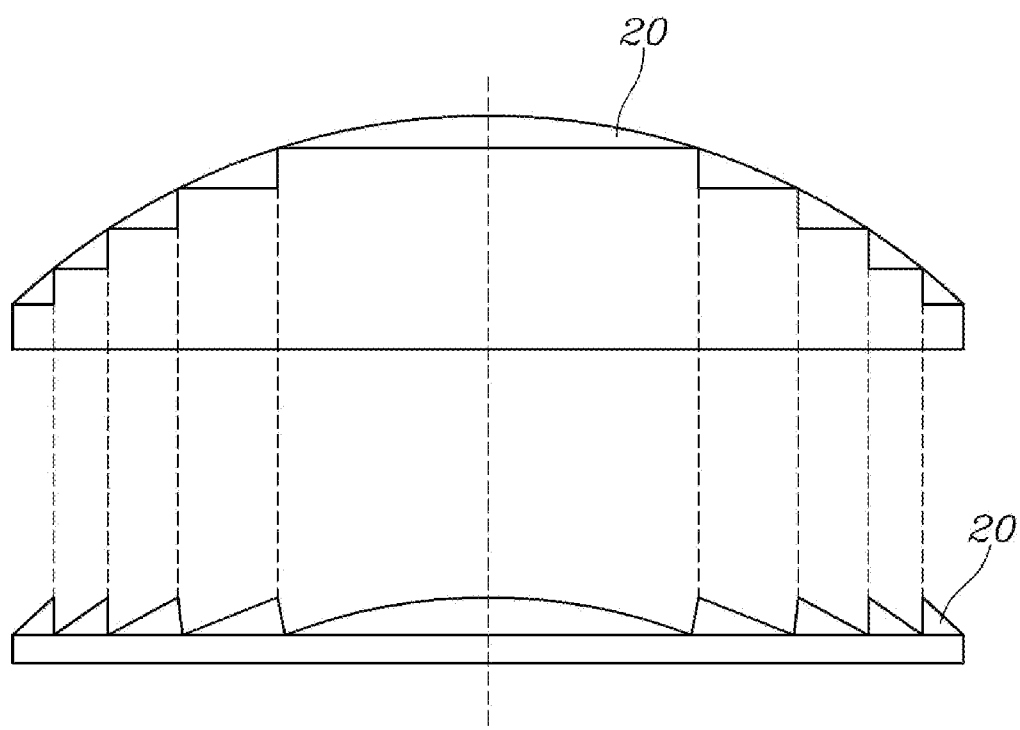
FIG. 3 is a view illustrating the collecting lens in some forms of the present disclosure.
Figure 4:
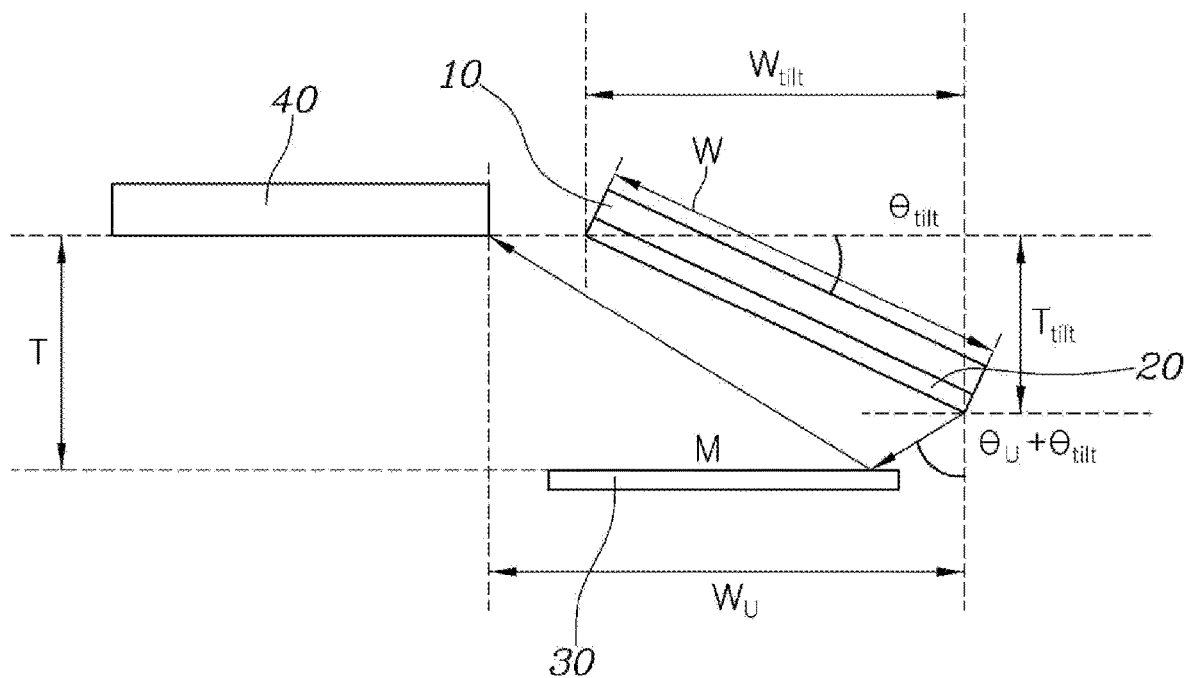
FIG. 4 is a view illustrating the relationship between the light source, the collecting lens and a reflective plate according to an embodiment of the present disclosure, in which the light source and the collecting lens are inclined with respect to the reflective plate.

FIG. 2 is a view illustrating the relationship between the light source 10 and the collecting lens 20 according to an embodiment of the present disclosure. FIG. 3 is a view illustrating the collecting lens 20 according to an embodiment of the present disclosure. FIG. 4 is a view illustrating the relationship between the light source 10, the collecting lens 20 and the reflective plate 30 according to an embodiment of the present disclosure, in which the light source 10 and the collecting lens 20 are inclined with respect to the reflective plate 30.

Referring to FIGS. 2 to 4, the collecting lens 20 according to an embodiment of the present disclosure may extend in a planar direction parallel to the light source 10, and may be an off-axis lens in which the focal axis is positioned beyond the outermost end of the collecting lens 20.

As illustrated in FIG. 2, the collecting lens 20 may be a lens configured to refract light, which is incident thereon, and thus to collect the light to the focal point. Specifically, the collecting lens 20 may be a portion of a convex lens or a Fresnel lens, which has a size corresponding to the size of the light source 10. In an embodiment, the collecting lens 20 may be the same size as the light source 10.

Furthermore, the collecting lens 20 may be a portion of a convex lens or a Fresnel lens that is located at a distance from the outermost edge of the convex lens or a Fresnel lens (defining the diameter of the convex lens or a Fresnel lens). Accordingly, it is possible to ensure the quality and size of an image. In an embodiment, the collecting lens 20 may be a portion of a convex lens or a Fresnel lens that is located such that the outermost end of the collecting lens 20 is remote from the outermost edge of the convex lens or the Fresnel lens by a distance of L=0.05 R.

Particularly, the collecting lens 20 may be configured to have a rectangular shape or a square shape. Furthermore, the collecting lens 20 may be configured such that the focal axis of the incident light, which extends parallel to the light from the focal point of the light, is positioned outside the outermost end of the collecting lens 20.

Specifically, an off-axis angle may be defined between the minimum off-axis angle and the maximum off-axis angle. The minimum off-axis angle ($\theta_L$) and the maximum off-axis angle ($\theta_U$) may be determined as follows.

$$\theta_L = \tan^{-1}\left(\frac{R-L-W}{F}\right)$$

$$\theta_U = \tan^{-1}\left(\frac{R-L}{F}\right)$$

Here, R is the radius of the convex lens or the Fresnel lens, F is the focal distance of the collecting lens 20, W is the size of the light source 10, and L is the distance between the outermost edge of the light source 10 and the outermost end of the convex lens or the Fresnel lens.

The focal axis of the collecting lens 20 may be positioned outside the outermost end of the collecting lens 20 such that the minimum off-axis angle ($\theta_L$) is larger than 0 (R−L>W).

The distance T between the dihedral reflector array 40 and the reflective plate 30 may be set with the maximum off-axis angle ($\theta_U$) so as to satisfy the following equations.

$$W_U = 2T \times \tan \theta_U$$

$$W_U - W = 2T \times \tan \theta_U - W > 0$$

Here, $W_U$ is the distance required to cause the focal point of light that is refracted at the maximum off-axis angle to be positioned beyond the collecting lens 20.

The collecting lens 20 may be a portion of a Fresnel lens in which a plurality of prisms for refracting incident light are coaxially arranged.

A general convex lens has a problem in that the volume thereof is increased and mounting thereof is difficult. In order to solve this problem, a Fresnel lens which includes a plurality of coaxially arranged prisms and is configured in a plate shape, may be employed.

The Fresnel lens may be manufactured in such a way as to form or shape a plurality of bands, which are coaxial with the center of the lens, into a flat shape.

The collecting lens 20 may be disposed so as to be spaced apart from the reflective plate 30 and to face the reflective plate 30. The collecting lens 20 may be inclined such that the collecting lens 20 becomes close to the reflective lens 30 moving from one end thereof toward the other end thereof. The light source 10 may be disposed parallel to the collecting lens 20, and may be inclined together with the collecting lens 20.

Specifically, the one end of the collecting lens 20 may be the outermost end closest to the focal axis of the collecting lens 20, and the other end of the collecting lens 20 may be the outermost end farthest from the focal axis of the collecting lens 20.

In other words, the collecting lens 20 may be inclined so as to become close to the reflecting plate 30 moving from the end closest to the focal axis toward the other end, which is farthest from the focal axis.

Specifically, the collecting lens 20 may be inclined at an angle that satisfies a first requirement in which the other end of the collecting lens 20 should be spaced apart from the reflective plate 30, and a second requirement in which the focal axis of the light that is refracted at the other end of the collecting lens 20 and is then reflected by the reflective plate 30 should be positioned beyond the one end of the collecting lens 20.

The angle ($\theta_{tilt}$) between the collecting lens 20 and the reflective plate 30 in the state in which the collecting lens 20 is inclined with respect to the reflective plate 30 may be set to satisfy the following requirements.

$$T > T_{tilt} \quad (1)$$

$$W_U - W_{tilt} = (2T = W \times \sin(\theta_{tilt})) \times \tan(\theta_U + \theta_{tilt}) - W \times \cos(\theta_{tilt}) > 0 \quad (2)$$

Specifically, when the collecting lens 20 is inclined at an angle of $\theta_{tilt}$ with respect to the reflective plate 30, the distance ($W_U$) between a proximal end of the dihedral reflector array 40 and the other end of the collecting lens 20, the height ($T_{tilt}$) of the dihedral reflector array 40 from the second end of the collecting lens 20 and the horizontal width ($W_{tilt}$) of the collecting lens 20, which are set so as to cause the focal axis of the light that is refracted at the collecting lens 20 at the maximum off-axis angle ($\theta_U$) to be positioned beyond the collecting lens 20, are as follows.

$$W_U = (2T - T_{tilt}) \times \tan(\theta_U + \theta_{tilt})$$

$$T_{tilt} = W \times \sin(\theta_{tilt})$$

$$W_{tilt} = W \times \cos(\theta_{tilt})$$

Accordingly, when $\theta_{tilt}$ is 32 degrees, the distance (T) between the dihedral reflector array 40 and the reflective plate 30 may be minimized. Particularly, the distance (T) may be reduced to about half compared to the case in which the collecting lens 20 is not inclined.

The width (M) of the reflective plate 30 may be calculated as follows. Consequently, the width (M) of the reflective plate 30 may be set to be about 1.24 times the width (W) of the display.

$$M = W \times (\cos\theta_{tilt} + \tan\theta_{tilt} \times \tan(\theta_L + \theta_{tilt}))$$

Figure 5:
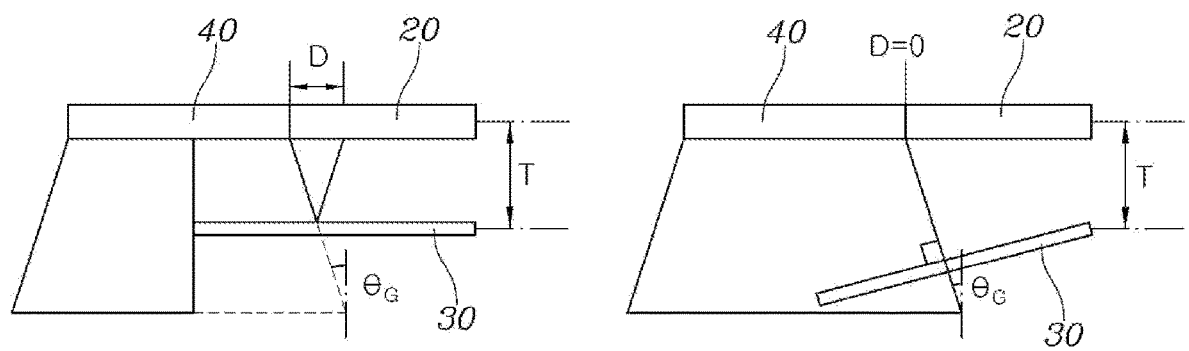
FIG. 5 is a view illustrating the disposition of the reflective plate and a dihedral reflector array in some forms of the present disclosure.

FIG. 5 is a view illustrating the disposition of the reflective plate 30 and the dihedral reflector array 40 according to an embodiment of the present disclosure.

In an embodiment, the reflective plate 30 may be disposed so as to face both the collecting lens 20 and the dihedral reflector array 40, which are spaced apart from each other in a planar direction.

In other words, the collecting lens 20 and the dihedral reflector array 40 may be disposed in the same direction, and the reflective plate 30 may be disposed such that the reflective surface thereof faces both the collecting lens 20 and the dihedral reflector array 40.

Particularly, the reflective plate 30 may extend in a direction parallel to the direction in which the dihedral reflector array 40 extends.

In another embodiment, the reflective plate 30 may be disposed so as to be inclined with respect to the dihedral reflector array 40 at a predetermined angle, which is determined in consideration of a ghost-image-displaying area in which a ghost image is generated due to reflection of incident light at the dihedral reflector array 40.

When the dihedral reflector array 40 is used, an unwanted ghost image may be generated depending on the viewing angle and the distance between the reflective plate and the display. The ghost image may be eliminated by checking the ghost-image-displaying area on the dihedral reflector array 40 and positioning the display outside the ghost-image-displaying area.

Particularly, the ghost-image-displaying area may be generated by the reflection of light by the mirrors of the dihedral reflector array 40 an odd number of times. Because a normal floating image is formed so to be wider than the ghost-image-displaying area, it is possible to eliminate the ghost image if the display is positioned outside the ghost-image-displaying area.

In an embodiment, the light source 10 may be positioned outside the ghost-image-displaying area on the dihedral reflector array 40.

In another embodiment, the reflective plate 30 may be inclined with respect to the dihedral reflector array 40 at a predetermined angle ($\theta_G$), which is determined in consideration of the ghost-image-displaying area, rather than being disposed parallel to the dihedral reflector array 40.

Specifically, the reflective plate 30 may be inclined such that a line normal to the flat surface thereof is parallel to the boundary of the ghost-image-displaying area.

The boundary of the ghost-image-displaying area may be expanded outwards by a predetermined angle ($\theta_G$) from the line vertical to the dihedral reflector array 40. The reflective plate 30 may be inclined by a predetermined angle ($\theta_G$) with respect to the dihedral reflector array 40, or the line normal to the reflective plate 30 may be disposed parallel to the boundary of the ghost-image-displaying area. Here, the predetermined angle ($\theta_G$) may be about 12 degrees.

Consequently, since the light source 10 or the collecting lens 20 is not visibly reflected at the reflective plate 30, there is an effect of eliminating the ghost image.

Figure 6:
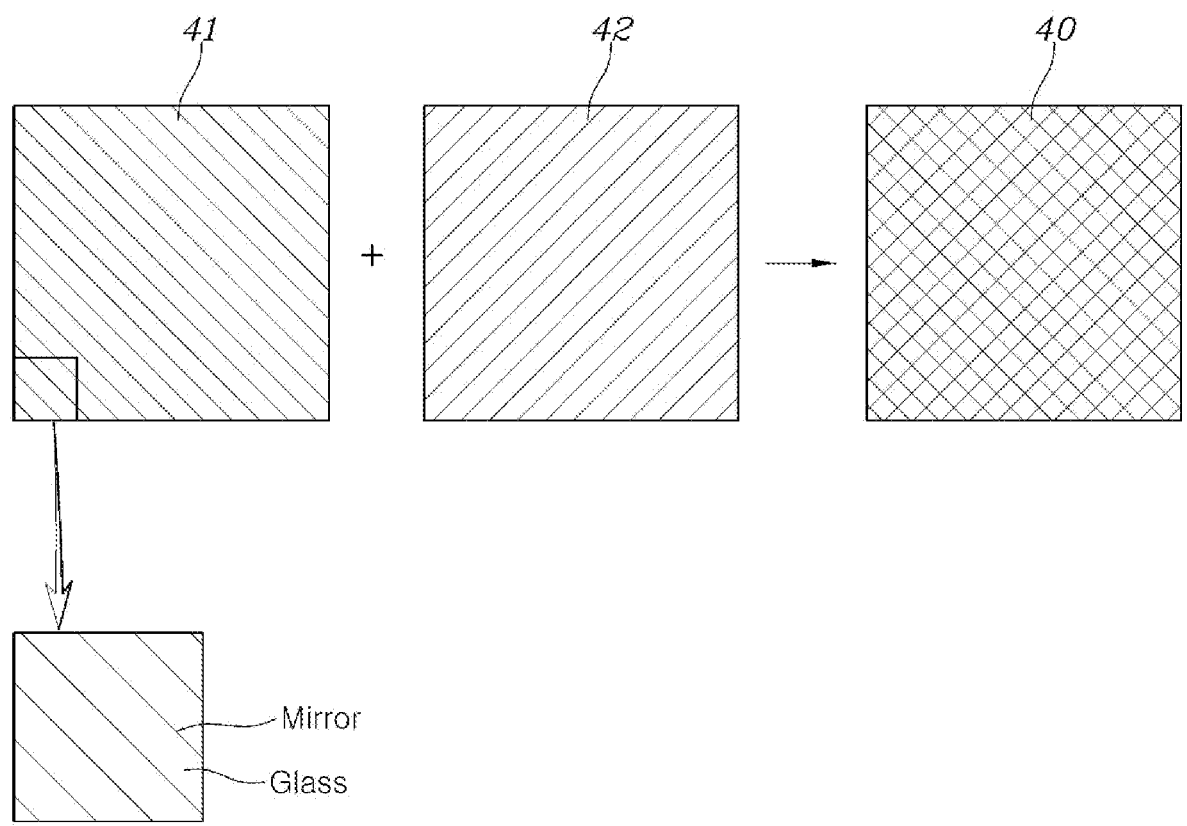
FIG. 6 is a view illustrating the structure of the dihedral reflector array in some forms of the present disclosure.

FIG. 6 is a view illustrating the structure of the dihedral reflector array 40 according to an embodiment of the present disclosure.

Referring to FIG. 6, the dihedral reflector array 40 may be composed of an upper plate 41 and a lower plate 42, each of which includes mirrors, which are arranged on each other in a planar direction. The mirrors of the upper plate 41 and the mirrors of the lower plate 42 may extend in directions intersecting each other.

Each of the upper and lower plates 41 and 42 of the dihedral reflector array 40 may include a light-permeable material (for example, glass), which allows incident light to be transmitted therethrough, and mirrors, which are arranged in the light-permeable material in a planar direction. The mirrors may be arranged at an interval of 1 mm.

The mirrors of the upper plate 41 and the mirrors of the lower plate 42 may extend along the flat surface of the dihedral reflector array 40 in directions intersecting each other, and may be arranged in directions intersecting each other. Particularly, the mirrors of the upper plate 41 and the mirrors of the lower plate 42 may intersect each other at a right angle (90 degrees).

In another embodiment, the dihedral reflector array 40 may also be composed of a single panel and mirrors, which are disposed in the panel and extend in directions intersecting each other.

The dihedral reflector array 40 may be constructed such that the mirrors extend in directions intersecting each other at a right angle and the light reflected by the reflective plate 30 is obliquely incident on the individual mirrors, which extend in directions intersecting each other.

In other words, in order to enable the light incident on one surface of the dihedral reflector array 40 to be reflected by the mirrors, which extend in directions intersecting each other at the right angle, and to be emitted from the other surface of the dihedral reflector array 40, the light incident on the dihedral reflector array 40 may be obliquely incident on the individual mirrors.

Referring again to FIG. 1, the apparatus for displaying a floating image according to an embodiment of the present disclosure may be constructed such that the reflective plate 30 is spaced apart from the dihedral reflector array 40 (Gap G) while being inclined with respect to a planar direction parallel to the dihedral reflector array 40 at an angle ($\theta_M$).

The light source 10 and the collecting lens 20 may be inclined with respect to the reflective plate 30 at an angle ($\theta_D$). Consequently, the light source 10 and the collecting lens 20 may be inclined with respect to a planar direction parallel to the dihedral reflector array 40 at an angle ($\theta_D$-$\theta_M$).

Consequently, there is an effect of reducing the maximum distance (Gap G) between the reflective plate 30 and the dihedral reflector array 40 to about 44% or less of the distance (F) between the floating image I and the dihedral reflector array 40.

Figure 7:
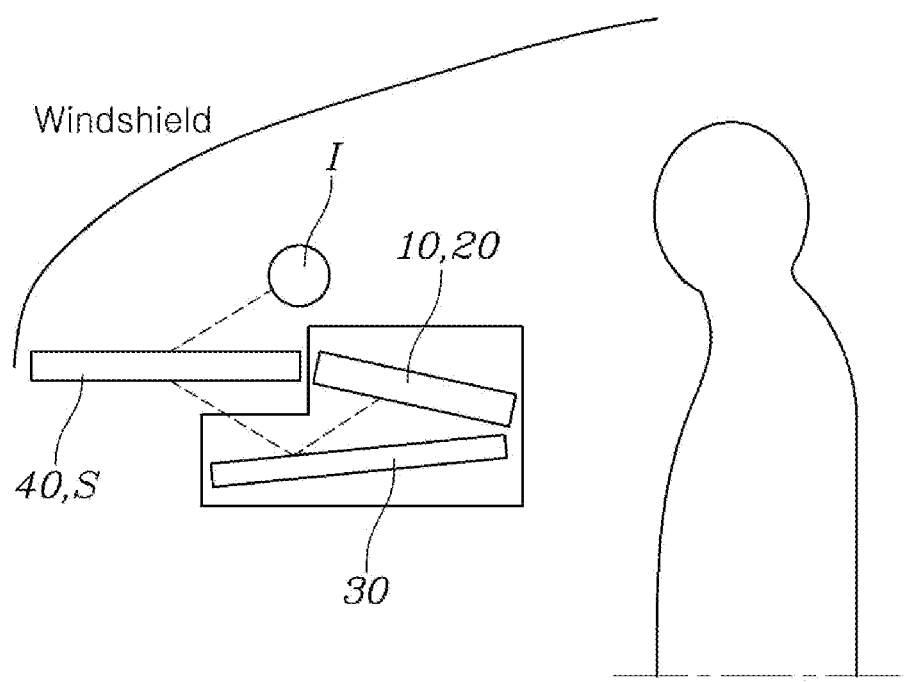
FIGS. 7 and 8 are views illustrating vehicular display modules, each of which includes the apparatus for displaying a floating image, in some forms of the present disclosure.
Figure 8:
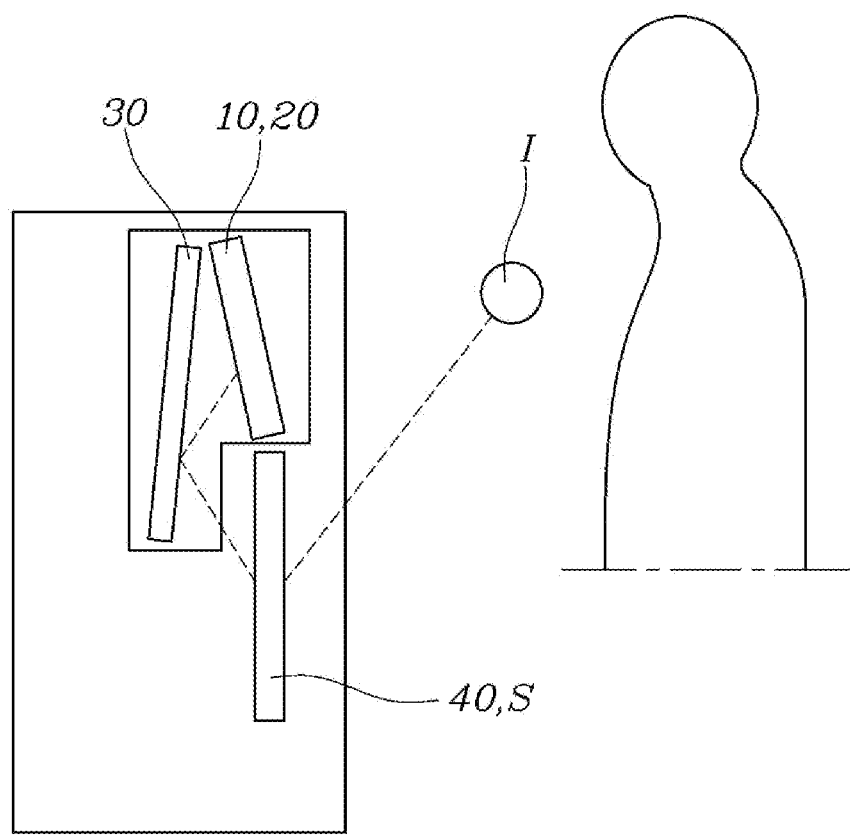

FIGS. 7 and 8 are views illustrating vehicular display modules, each of which includes the apparatus for displaying a floating image, according to an embodiment and another embodiment of the present disclosure.

Referring to FIGS. 7 and 8, the vehicular display module according to each of the two embodiments of the present disclosure may further include an interior structure S, which extends along a plane along which the dihedral reflector array 40 extends. The interior structure S may be a dashboard or a console panel for a vehicle, and the floating image may be formed at a position above the interior structure S or at a position between the apparatus and an occupant.

Here, the interior structure S may be a dashboard for a vehicle or a console panel including an audio video navigation (AVN) unit for a vehicle.

The dihedral reflector array 40 may be disposed parallel to the interior structure S, and may form a floating image at a position that is remote from the dihedral reflector array 40 in the upward direction or toward an occupant.

In an embodiment, when the dihedral reflector array 40 is mounted on a vehicle dashboard, the floating image may be positioned over the dashboard, and may display contents relating to driving assistance or a destination address.

In another embodiment, when the dihedral reflector array 40 is mounted on a console panel, which is positioned in front of an occupant, the floating image may be formed in front of the passenger. In this case, the display module is capable of displaying information about driving of a vehicle, and is capable of recognizing a gesture of an occupant and thus of controlling an AVN, an air conditioning apparatus or the like.

As is apparent from the above description, the present disclosure provides an apparatus for displaying a floating image and a vehicular display module including the same, in which light from a light source is incident on a dihedral reflector array through a collecting lens and a reflective plate, thereby offering an effect of reducing the volume of the apparatus symmetrical with the floating height of a floating image, unlike the conventional technology.

Furthermore, it is possible to provide an effect of eliminating a ghost image, which is generated when light is reflected in a dihedral reflector array an odd number of times.

Although the preferred embodiments of the present disclosure have been described above with reference to the accompanying drawings, those skilled in the art will appreciate that the present disclosure can be implemented in various other embodiments without changing the technical ideas or features thereof.

What is claimed is:

1. An apparatus for displaying a floating image comprising:
   a light source configured to:
      extend in a planar direction; and
      emit light for realizing the floating image;
   a collecting lens configured to:
      extend in a direction parallel to the light source; and
      refract the light;
   a reflective plate configured to:
      face the collecting lens; and
      reflect light that is refracted at the collective lens; and
   a dihedral reflector array configured to extend in a planar direction and includes mirrors extending in directions intersecting each other,
   wherein a first surface of the dihedral reflector array is configured to face the reflective plate such that:
      the reflected light is incident on the first surface, and
      the reflected light is emitted from a second surface of the dihedral reflector array by being reflected by the mirrors, thereby realizing the floating image at a position spaced apart from the second surface;
   wherein the collecting lens is spaced apart from the reflective plate to face the reflective plate, and the collecting lens is included such that the collecting lens is close to the reflective plate moving from a first end of the collecting lens toward a second end of the collecting lens;
   wherein the collecting lens is inclined at an angle that satisfies requirements that:
      the second end of the collecting lens is spaced apart from the reflective plate; and
      a focal axis of light that is refracted at the second end of the collecting lens and reflected by the reflective plate is positioned beyond the first end of the collecting lens.

2. The apparatus according to claim 1, wherein the light source comprises:

a display panel configured to generate light for realizing the floating image at a position spaced apart from the dihedral reflector array.

3. The apparatus according to claim 1, wherein the collecting lens comprises:
an off-axis lens configured to extend in a planar direction parallel to the light source, wherein a focal axis of the off-axis lens is positioned beyond an outermost end of the collecting lens.

4. The apparatus according to claim 1, wherein the collecting lens comprises:
a Fresnel lens in which a plurality of prisms configured to refract incident light is coaxially arranged.

5. The apparatus according to claim 1, wherein the first end of the collecting lens is an outermost end closest to a focal axis of the collecting lens, and the second end of the collecting lens is an outermost end farthest from the focal axis of the collecting lens.

6. The apparatus according to claim 1, wherein the reflective plate is configured to face both the collecting lens and the dihedral reflector array, which are spaced apart from each other in a planar direction.

7. The apparatus according to claim 1, wherein the reflective plate is disposed to be inclined with respect to the dihedral reflector array at a predetermined angle, which is determined based on a ghost-image-displaying area in which a ghost image is generated due to reflection of incident light at the dihedral reflector array.

8. The apparatus according to claim 7, wherein the reflective plate is inclined such that a line is parallel to a boundary of the ghost-image-displaying area.

9. The apparatus according to claim 1, wherein the dihedral reflector array comprises:
an upper plate and a lower plate, each of which includes mirrors which are arranged in a planar direction, the mirrors of the upper plate and the mirrors of the lower plate extending in directions intersecting each other.

10. The apparatus according to claim 1, wherein the dihedral reflector array is configured such that the mirrors extend in directions intersecting each other at a right angle and the light reflected by the reflective plate is obliquely incident on the individual mirrors, which extend in directions intersecting each other.

11. A vehicular display module comprising:
an apparatus for displaying a floating image comprising:
a light source configured to:
extend in a planar direction; and
emit light for realizing the floating image;
a collecting lens configured to:
extend in a direction parallel to the light source; and
refract the light;
a reflective plate configured to:
face the collecting lens; and
reflect light that is refracted at the collective lens; and
a dihedral reflector array configured to extend in a planar direction and includes mirrors extending in directions intersecting each other,
wherein a first surface of the dihedral reflector array is configured to face the reflective plate such that:
the reflected light is incident on the first surface, and
the reflected light is emitted from a second surface of the dihedral reflector array by being reflected by the mirrors, thereby realizing the floating image at a position spaced apart from the second surface; and
an interior structure extending in a direction in which the dihedral reflector array extends,
wherein the interior structure includes a dashboard or a console panel for a vehicle, and the floating image is formed at a position above the interior structure or at a position between the apparatus and an occupant;
wherein the collecting lens is spaced apart from the reflective plate to face the reflective plate, and the collecting lens is included such that the collecting lens is close to the reflective plate moving from a first end of the collecting lens toward a second end of the collecting lens;
wherein the collecting lens is inclined at an angle that satisfies requirements that:
the second end of the collecting lens is spaced apart from the reflective plate; and
a focal axis of light that is refracted at the second end of the collecting lens and reflected by the reflective plate is positioned beyond the first end of the collecting lens.

* * * * *